3,066,125
DIENE POLYMERIZATION AND CATALYSTS THEREFOR
Lee M. Porter, Concord, and Jaroslav G. Balas, Orinda, Calif., assignors to Shell Oil Company, a corporation of Delaware
No Drawing. Filed June 16, 1958, Ser. No. 742,016
16 Claims. (Cl. 260—94.3)

This invention relates to improvement in the polymerization of conjugated dienes. More particularly it relates to processes for the polymerization of conjugated dienes by the employment of novel polymerization catalysts.

It has been reported that conjugated dienes, as butadiene, isoprene, and the like, may be polymerized to produce cis 1,4-addition products by conducting the polymerization in the presence of certain organo-metallic catalysts. The products thus obtained are useful in the formation of rubber compositions. Those processes, however, have certain disadvantages which the present invention overcomes. For one thing, the prior art processes for the polymerization of conjugated dienes usually results in a product which contains substantial portions of catalyst residues which are not readily separated from the polymer. The catalyst residues, which remain in the polymer, are undesirable because they reduce the stability of the polymer and may hasten degradation and cross-linking. Another disadvantage is that the catalysts are expensive and difficult to handle. Additionally, the cis 1,4-addition products produced very often are of varying molecular weight from one batch to the next because the polymerization is very sensitive to variation in the catalyst composition.

It is an object of this invention to provide novel catalysts for the polymerization of conjugated dienes. It is another object of this invention to provide novel catalysts for the polymerization of conjugated dienes which will produce polymer having a high cis 1,4-content. It is still another object of this invention to provide novel polymerization catalyst and processes for the polymerization of conjugated dienes which catalysts are abundant, inexpensive and easy to handle. It is still another object of this invention to provide simple processes for the polymerization of conjugated dienes which processes employ the novel catalysts to produce polymer of uniform molecular weight. Other objects will become apparent as the description of the invention proceeds.

These and other objects are accomplished by the process comprising polymerizing a hydrocarbon solution of a conjugated diene at temperatures ranging from 0° C. to about 150° C. in the presence of a catalyst which is a complex of an acidic metal halide and a transition metal halide prepared in a liquid hydrocarbon, the mole ratio of the acidic metal to the transition metal being greater than 1. In considering the two metal halides which are used to prepare the catalyst it will be understood that the metals will always be different. Thus an acid metal halide as titanium tetrahalide and a transition metal halide as titanium trihalide will not be used together as the sole constituents.

As previously indicated the present invention is directed to the polymerization of conjugated dienes such as isoprene, chloroprene, butadiene, and similar conjugated dienes. In the preferred embodiment the processes of this invention are particularly suited to the polymerization of conjugated dienes having from 4 to 8 carbon atoms with the species of butadiene being particularly suited. Accordingly, the invention is described in greatest detail as it relates to the polymerization of butadiene but it will be understood that other conjugated dienes may be similarly polymerized. The monomeric conjugated diene preferably is in a form which is substantially free of impurities such as water, oxygen, oxygen-containing compounds, sulfur, sulfur-containing compounds, and the like. The present invention, however, may be employed for the polymerization of a mixture of conjugated dienes as isoprene-butadiene, chloroprene-butadiene, and the like as well as for the copolymerization of a conjugated diene with a mono-alpha-olefin as ethylene, propylene and the like.

The monomeric conjugated diene at the beginning of the polymerization is contained in solution with the hydrocarbon diluent. Among the hydrocarbon diluents aromatic hydrocarbons are preferred. Good results are also obtained with mixtures of liquid hydrocarbons wherein only a portion thereof is an aromatic or cyclic hydrocarbon. In the most preferred embodiment benzene is used as the sole diluent for the conjugated diene although alkylated benzenes may be employed. Among the other hydrocarbons that may be employed there may be mentioned toluene, the xylenes, mesitylene, ethylbenzene and other normally liquid cyclic compounds. Cyclic compounds having active unsaturation in alkyl radicals are less preferred as they may copolymerize. In some cases however the unsaturation is not reactive and they may also be used particularly under the milder conditions of polymerization. Such hydrocarbons are represented by, for example, allylbenzene. Aliphatic hydrocarbons which may be employed include for example hexane, octane, isooctane, and the like, but such diluents are best employed in admixture with an aromatic hydrocarbon as benzene. When mixed hydrocarbon diluents are employed good results are obtained if the aromatic hydrocarbon is present in the order of about 5%, by weight, or higher.

The solution of the conjugated diene in the diluent may range from about 5%, by weight, to about 25%, by weight. Variations within this range may be made as desired in order to control viscosity and molecular weight of the polymer. At lower concentrations the viscosity of the polymer solution and the molecular weight of the polymer will be lower.

The novel catalysts of this invention are complexes formed from two essential ingredients, i.e., an acidic metal halide and a transition metal halide, both of which preferably are employed in substantially pure and anhydrous forms. The presence of impurities does not negate operability of this invention but it makes production and quality control more difficult. Of the acidic metal halides, aluminum halides are preferred with the chloride being particularly preferred followed by aluminum bromide and the other aluminum halides all of which should be pretreated to remove any moisture which may be present. Aluminum chloride that has been resublimed is found to be particularly outstanding for the production of cis 1,4-polymer of conjugated dienes. Other acidic metal halides that are used in this invention include the halides of zinc, ferric, stannic, titanium (IV), and the like with the chlorides thereof being best. The other component from which the complex catalysts are formed is not limited to any particular transition metal halide but it is particularly advantageous to employ a metal halide in group VIII of the periodic table, particularly those appearing in the first long period of the periodic table including particularly cobalt and nickel. Other transition metal halides may be employed but they are considerably less suitable by reason of yield, conversions, rates of reaction, and quality of the polymer which is ultimately produced. The halides of the transition metals in order of preference include first the chlorides, followed by the bromides with the others being less suitable for the same reasons outlined above.

The present invention may be adapted to produce any of the several forms of polymer by varying the selection of the catalyst components used to prepare the complex catalyst. This may be illustrated by making reference to polymer produced from butadiene which may appear in several forms such as the various 1,2-addition products, the trans 1,4-addition product and the most preferred species of cis 1,4-addition product. A polymer having a high cis 1,4-addition product of polybutadiene is easily obtained when the catalyst is prepared from the most preferred components, e.g., cobalt chloride and aluminum chloride. Such a polymer will have a cis 1,4-content in the order of 95–98% or even higher. On the other hand, when a polymer is prepared from butadiene and a catalyst prepared from a group IV transition metal halide, as a titanium or zirconium chloride, and an aluminum halide it will be found that the cis content is substantially reduced and the trans 1,4-content is increased. Other transition metal halides that can be used in the preparation of the complex include, for example, those of vanadium, manganese, thorium, hafnium, and others but as previously indicated they are less preferred. While the catalysts of this invention are formed from essentially two components, namely the acidic metal halides and transition metal halides it will be appreciated that the catalyst may be suitably prepared from two or more components within each group without departing from the spirit of this invention. This is represented, for example, by a catalyst prepared from a mixture of aluminum chloride, aluminum bromide, cobalt chloride and/or nickel chloride. Such mixtures would not normally be employed as it increases material handling costs. It is noteworthy, however, that there is some indication that such mixtures may be usefully employed to control molecular weight of the polymer particularly when nickel halides are involved in which event mixtures of the type indicated could be beneficially employed.

It is an outstanding advantage of the present invention that the catalysts are very simple to prepare. In essence all that is required is that the catalyst components be mixed in a hydrocarbon diluent of the type previously described and the complex be permitted to form. Preferably the hydrocarbon diluent for the monomer and the catalyst preparation should be the same and accordingly benzene, or a benzene containing mixture, is preferred for the catalyst preparation. The catalyst formation is hastened if the hydrocarbon diluent containing the catalyst components is refluxed for a period ranging from a few minutes to a few hours. Alternatively, the catalyst may be permitted to form from the components by merely allowing the mixture to stand for several hours. Best results are obtained however when the maximum amount of catalyst components react and go into solution in the hydrocarbon diluent. In the most preferred embodiment the catalyst components are added to the hydrocarbon diluent, the mixture is heated and thereafter the excess solids are removed by filtering, centrifuging, or decanting. The catalyst is then in a soluble form which is contained in the hydrocarbon diluent. This technique is particularly preferred because it produces a more active form of catalyst. Additionally, it produces a catalyst composition which is uniform from one batch preparation to the next because, in essence, a saturated solution of the complex is contained in the hydrocarbon diluent. A third and very substantial advantage is that the catalyst is free of solids which would otherwise be mixed with the polymer and produce a product having less desirable qualities because of the adverse effect of large amounts of the catalyst residues. Another technique for the preparation of the catalysts of this invention comprises the addition to the hydrocarbon diluent of just that amount of the catalyst components which will form the catalysts in the liquid hydrocarbon and thereby avoiding any subsequent separation of the excess solids. Still other techniques and methods may be employed for producing the complex catalyst of this invention which would produce the same result.

According to the present invention the catalyst components are charged to the hydrocarbon diluent so that the mole ratio of the acidic metal halide to the transition metal halide is greater than one in the final catalyst. The specific quantities of the components which are added to the hydrocarbon diluent will vary depending upon the solubilities of the particular components and the hydrocarbon diluent employed but in general it is always preferred to add an excess over that which will go into solution in the hydrocarbon diluent and the excess of the solid component may thereafter be separated. In the most preferred procedures the mole ratios are in the order of about 2:1 to about 5:1 as it is found that soluble catalyst contains the metal component within that ratio. It is an advantage of this invention that great care need not be exercised in adding the catalyst components to the diluent because the preferred procedures will always give the desired catalyst irrespective of the quantity of the components that are added because solubility constants and reaction constants are involved. The quantity of the complex catalyst which is in solution will vary widely depending on the choice of the components and the diluent, or solvent, and may range from 5 to 50,000 p.p.m. of the diluent. More often however the range will be in the order of 5 to 2,000 p.p.m. This will seem to be quite low and a surprising feature of this invention is that such excellent results are obtained with small catalyst concentrations. It is this feature which affords one of the principal advantages of this invention because the quantity of catalyst residues in the polymer are practically nil.

The catalyst may be prepared in any suitable vessel that is closed to the atmosphere. Desirably, the vessel is flushed with an inert gas, as nitrogen, before the various ingredients are charged. Caution should be exercised as the formation of the complex may be accompanied by the evolution of heat and cooling may be necessary.

In conducting the polymerizations of this invention temperatures ranging from about −40° C. to about 150° C may be employed. The particular temperature selected will vary depending upon certain variables which are inherent in the process. For example, the present invention is characterized by fast polymerization rates. In some cases it may be desirable therefore to conduct the polymerization at lower temperatures to slow down the polymerization. The slowdown of the polymerization in such cases facilitates production control and minimizes the danger of damaging the polymerization apparatus. In other cases, particularly where the catalyst is less active, it may be desirable to operate at the higher temperature, i.e., in the order of 40–100° C. or even 150° C. Another outstanding advantage of this invention is that the polymerizations, in most cases, may be conducted easily at about room temperatures therby minimizing the cost of heat transfer equipment.

Another means of controlling the rate of polymerization is by adjusting the amount of catalyst employed, which amounts vary depending on the particular components contained in the catalyst. In the most preferred embodiments, i.e., using a catalyst prepared from cobalt chloride and aluminum chloride for example, very fast polymerizations are obtained with as little as 20 p.p.m. of cobalt based on the weight of the total reaction mixture. By reducing the amount, i.e. to 1 p.p.m. slower rates are obtained. With higher amounts, i.e. in the order of 50 p.p.m. the reaction is so fast as to present the danger of damaging the apparatus. With other species of metal halides the rates will differ so that, in general, the amount of complex that is employed may vary from .1 to 200 p.p.m. of the transition metal based on the total reaction mixture.

Another advantage of the present processes for polymerizing conjugated dienes is that the polymerizations are conducted at low pressures in the preferred procedures.

In actual practice all that is normally required is that the polymerization reactor be sealed so as to exclude the atmosphere from the reactor. This is desirable because oxygen and moisture are harmful to the polymerization. Accordingly, in the preferred embodiment it will be found that atmospheric pressures are suitable when the polymerization is conducted at about room temperatures. When the polymerization is conducted at higher temperatures then higher pressures will be created within the reactor but in almost all instances it is unnecessary to increase the pressure from external sources. The preferred pressures are suitably defined as "autogenic pressures" which refers to the pressure created by the system under the conditions of reaction. Such pressures will vary depending upon the temperature, the nature and quantity of the diluent, and the like.

The polymerization is begun by merely charging the liquid catalyst to a solution of a conjugated diene in the hydrocarbon diluent while agitating the contents of the reactor. The catalyst solution is added to the reactor in such a way that it does not come in contact with the atmosphere. Accordingly, the reactor is equipped with a suitable fixture to permit such charging of the liquid catalyst and the conjugated diene. A typical procedure comprises preparing the solution of the conjugated diene in a separate vessel and thereafter metering the thus prepared solution to the reactor. If desired, the solution of the conjugated diene in the hydrocarbon diluent may be prepared in the polymerization reactor. It is best that the monomeric conjugated diene and liquid catalyst be thoroughly mixed from the start and in a batch reactor this is simply accomplished by agitation while adding the liquid catalyst. In continuous operations, which employ, for example, a tubular reactor, this may be accomplished by feeding the soluble catalyst in at a point near the inlet for the diene. In batch and continuous operations the residence time of the polymerization mixture is controlled by any suitable means which are known in the art.

As the polymerization proceeds, the polymer will form and remain in solution so that at the end of the polymerization cycle a viscous liquid is obtained. The polymer is recovered by the addition of a coagulating agent as acetone, a lower alcohol, such as methanol, ethanol, or the like, whereupon a coagulum of the polymer is formed. The polymer is then recovered by merely separating the solid polymer from the liquid. It is another advantage of this invention that the coagulum need not be treated further in order to separate catalyst residues as the residues are sufficiently low after the first coagulation. This is of considerable importance since several washings of the polymer were necessary heretofore.

In addition to butadiene and isoprene, other conjugated dienes which may be polymerized according to the present invention include 2,3-dimethyl-1,3-butadiene, 2-ethyl-1,3-butadiene, 4-methyl-1,3-hexadiene, 2-methyl-1,3-pentadiene, 2-isopropyl-1,3-butadiene, 2,4,6-octatriene, 2-amyl-1,3-butadiene, piperylene and the like, as well as mixtures thereof.

The present invention is described in greater detail in the following examples.

*Example 1*

To a 100-milliliter flask, which is purged with nitrogen to remove air, is added 11 grams of aluminum chloride and 1 gram of cobalt chloride followed by 80 milliliters of benzene. After refluxing for several hours in the presence of nitrogen the contents of the flask are cooled to room temperature. There is obtained a solid layer on the bottom of the flask, and an upper liquid layer which is a clear emerald green color. The liquid layer is the preferred catalyst of this invention. Two milliliters of the green solution is then added to a flask containing 30 milliliters of benzene. The green solution and the benzene is not permitted to come in contact with the air during their transfer to the flask. Thereafter, butadiene is bubbled through the mixture of the benzene and the green solution for about 50 minutes in order to effect the polymerization. An equal volume of methanol is then added whereupon a solid coagulates. The coagulum is identified as polybutadiene having a cis 1,4-content of about 78%, trans 1,4-content of about 17% and the balance being 1,2-polybutadiene. Analysis is made by infrared spectrum.

*Example 2*

To a flask containing 100 ccs. of benzene is added 20 gms. of zinc chloride and 2 gms. of $CoCl_2$. The mixture is briefly agitated and allowed to stand for several days. Thereafter butadiene is added to the supernatant liquid to give a 10% solution of the butadiene. After agitating for several hours, the polymer is coagulated with isopropanol and then separated. The product contains 79% of the trans 1,4-addition product and 21% of the cis 1,4-addition product.

*Example 3*

The procedure described in Example 1 for the preparation of the liquid catalyst is repeated except that it is prepared from .2 gram of cobalt chloride and .5 cc. of titanium tetrachloride as a 21% by weight, solution in benzene. The catalyst components are refluxed in 60 milliliters of benzene for 2 hours and 40 minutes. The liquid fraction is a clear green solution as in Example 1. Two milliliters of the green solution are added to 300 milliliters of benzene in a flask which is free of air after which butadiene is bubbled through the liquid for 2 hours and 20 minutes at room temperature. Thereafter isopropyl alcohol is added in an equal volume to yield a coagulum. In this case the polybutadiene contains about 54% of the 1,2-addition product, the balance being cis 1,4- and trans 1,4-addition products.

*Example 4*

To a liter flask equipped with an agitator and suitable inlets and outlets is added 4.2 grams of cobalt chloride, 12.6 grams of resublimed aluminum chloride and 500 ccs. of benzene. With constant agitation the contents of the flask are refluxed in an inert atmosphere for about 10 hours. The refluxing for 10 hours is to assure that a saturated solution of the reaction product of the cobalt chloride and aluminum chloride is obtained. Subsequent experiments indicate that substantially less than 10 hours are equally satisfactory. After standing for a short period of time there is obtained a clear, deep green solution as an upper fraction with a solid fraction at the bottom of the flask. After cooling the two fractions are separated by pressuring the vessel with nitrogen to force out the liquid portion of the catalyst into another container so that it does not come in contact with the atmosphere or oxygen. Analysis of the liquid fraction shows that it contains about 3 moles of aluminum chloride per mole of cobalt chloride and in this case this solution contains about 1000 parts per million of cobalt. A polymerization is conducted by charging a flask with a saturated solution of butadiene in benzene under conditions which exclude atmospheric oxygen and moisture. With constant agitation is added an amount of the above liquid fraction to give 20 parts per million of cobalt based on the total weight of the reaction mixture. The temperature of the reaction mixture rises due to an exotherm to about 35–40° C. and after about 10 minutes the solution of polymer in the benzene becomes very viscous and difficult to agitate whereupon the polymerization is terminated by the addition of about 1 to 2 times the total volume with isopropyl alcohol. A coagulum of polybutadiene then forms. The polymer, after separation from the liquid phase by filtration, contains 97% of the cis 1,4-addition product, the balance being the 1,2- and trans 1,4-addition products. The polymer has an I.V. of about 3.2 determined in toluene at 25° C. The structure of the polymer is determined by infrared spectrum.

Example 5

The procedure of Example 4 is repeated except that the liquid catalyst is used in an amount to give 5 parts per million of cobalt based on the total weight of the reaction mixture. In this case the polymerization requires about 15 minutes before it becomes very viscous and difficult to stir. The product contains 97% of the cis 1,4-addition product.

Example 6

The procedure of Example 4 is repeated except that the quantity of the cobalt contained in the liquid catalyst amounts to about 50 parts per million based on the total weight of the reaction mixture. In this case the reaction goes extremely fast and is over in a matter of a few minutes. The polymer contains about 96% of the cis 1,4-addition product.

Example 7

The procedure of Example 4 is repeated for the preparation of the catalyst except that the aluminum chloride is replaced with an equivalent weight of aluminum bromide. There after the polymerization is conducted in the same way but it is found that approximately 30 minutes are required in order to obtain a similar conversion to polybutadiene. In an otherwise identical experiment the quantity of the cobalt contained in the liquid catalyst based on the total weight of the reaction mixture is about 100 parts per million. In this case the solution becomes very viscous in about 15 minutes.

Example 8

The procedure of Example 5 is repeated except that instead of using the clear liquid fraction as the catalyst there is employed a mixture of the liquid fraction and the solid fraction in an amount to give a total of 20 parts per million of cobalt in the polymerization mixture. In this case the polymerization proceeds in a substantially identical manner to yield a substantially identical reaction product. However, the ash content of the polymer, on ignition, is substantially higher.

Example 9

A catalyst is prepared by mixing 2 grams of nickel chloride and 6 grams of aluminum chloride in 300 grams of benzene in a dry flask. The addition is made in a manner so as to exclude the atmosphere from coming in contact with the components. The flask is sealed and permitted to stand for 3 days without agitation after which it is observed that a clear yellow liquid is contained as an upper layer and a solid fraction remains in the bottom of the flask. A polymerization is conducted under conditions which exclude atmospheric oxygen and moisture and in the presence of nitrogen by adding 12 ccs. of the above liquid fraction to 300 milliliters of benzene which is saturated with butadiene. The polymerization is conducted at about room temperature for a period of 24 hours. Thereafter there is added an equal volume of isopropyl alcohol whereupon the polymer coagulates. Upon infrared analysis the polymer is shown to contain 91.8% of the cis 1,4-addition product and the remainder being mainly the trans 1,4-addition product.

Example 10

The procedure of Example 9 is repeated except that in this case 30 ccs. of the liquid catalyst is employed. It is observed that the polymerization reaches a thick, viscous solution in about 3 hours. In addition, the ultimate product is found to contain a higher cis 1,4-content.

Example 11

The procedure of Example 9 is repeated except that an equivalent weight of nickel bromide replaces the nickel chloride. In this case the supernatant liquid is a clear, dark brown color and when 12 ccs. thereof are used to polymerize 300 milliliters of benzene saturated with butadiene there is obtained a polymer containing a cis 1,4-content of about 90% in about 24 hours.

Example 12

The procedure of Example 5 is repeated except that a saturated solution of isoprene in benzene replaces the butadiene solution. In this case the cis 1,4-addition product is substantially less and the total conversions are comparable.

In a series of experiments, using a variety of transition metal halides with acidic metal halides for the preparation of the catalyst, the preferred features of this invention are established. It should be noted, however, that in all cases substantial polymerization takes place and that the nature and amounts of the products vary depending mainly on the components selected for the formation of the catalyst. Among the transition metal that are found to be more active when used in the preparation of the catalyst there may be mentioned zirconium chlorides, vanadium chlorides, chromium chloride, manganese chloride and the corresponding bromides. Halogens other than the chlorides are also found to form useful catalysts.

While the cis 1,4-addition products find greatest utility in the manufacture of rubber products, particularly in the manufacture of thread stock for automobile and truck tires, polymers having substantial amounts of the trans 1,4-addition product and/or the 3,4-addition products are also useful for the production of rubber products which do not require the same physical properties. From the foregoing description it will be readily apparent that a variety of the various addition products may be prepared by varying, for example, the catalyst components, conditions of reaction and the like. Such variations however will be understood to be within the scope of this invention.

We claim as our invention:

1. A hydrocarbon solution of the reaction product of (1) a metal halide selected from the group consisting of cobaltous halide and nickelous halide and (2) an acidic metal halide selected from the group consisting of aluminum halide, zinc halide, ferric halide, stannic halide and titanium (IV) halide dissolved in a normally liquid hydrocarbon solvent, the mole ratio of the acidic metal halide to the transition metal halide being greater than 1 in the final product, the said solution being essentially free of solids.

2. The composition of claim 1 in which the transition metal halide is cobalt chloride.

3. The composition of claim 1 in which the acidic metal halide is aluminum chloride.

4. The composition of claim 1 in which the acidic metal halide is aluminum bromide.

5. The composition of claim 1 in which the hydrocarbon diluent contains benzene.

6. A hydrocarbon soluble reaction product of cobalt chloride and aluminum chloride dissolved in a normally liquid hydrocarbon solvent, the mole ratio of the aluminum chloride to the cobalt chloride being greater than 1 in the final product, the said solution being essentially free of solids.

7. The process for the polymerization of conjugated dienes which comprises reacting a hydrocarbon solution of the dienes at temperatures ranging from −40° to 150° C. in contact with a hydrocarbon-soluble reaction product of a transition metal halide selected from the group consisting of cobalt halide and nickel halide and an acidic metal halide selected from the group consisting of aluminum halide, zinc halide, ferric halide, stannic halide and titanium (IV) halide, the said hydrocarbon-soluble reaction product being dissolved in a normally liquid hydrocarbon solvent, the mole ratio of the acidic metal halide to the transition metal halide being greater than 1 in the final product, and the said reaction product being essentially free of solids.

8. The process of claim 7 in which the transition metal halide is cobalt chloride.

9. The process of claim 7 in which the hydrocarbon diluent contains an aromatic hydrocarbon.

10. The process of claim 7 in which the hydrocarbon diluent contains benzene.

11. The process of claim 7 in which the conjugated diene is butadiene.

12. The process for the polymerization of butadiene comprising reacting a hydrocarbon solution of butadiene at temperatures ranging from −40° to 150° C. in contact with a hydrocarbon soluble reaction product of cobalt chloride and aluminum chloride dissolved in a normally liquid hydrocarbon solvent, the mole ratio of the aluminum chloride to the cobalt chloride being greater than 1 in the final product, the said reaction product being essentially free of solids.

13. The process comprising reacting together an acidic metal halide selected from the group consisting of aluminum halide, zinc halide, ferric halide, stannic halide and titanium (IV) halide and a transition metal halide selected from the group consisting of cobalt halide and nickel halide in a normally liquid hydrocarbon solvent, the said reaction being conducted in an inert atmosphere and thereafter separating the solid fraction from the resulting liquid fraction and recovering the liquid fraction which is essentially free of solids.

14. The process of claim 13 in which the acidic metal halide is aluminum chloride.

15. The process of claim 13 in which the transition metal halide is cobalt chloride.

16. The process of claim 13 in which the hydrocarbon solvent contains benzene.

References Cited in the file of this patent

UNITED STATES PATENTS

| | | |
|---|---|---|
| 2,476,416 | Ipatieff et al. | July 19, 1949 |
| 2,865,841 | Hoekstra | Dec. 23, 1958 |
| 2,868,771 | Ray | Jan. 13, 1959 |
| 2,910,461 | Nowlin | Oct. 27, 1959 |
| 2,925,410 | Coover | Feb. 16, 1960 |
| 2,928,818 | Carter | Mar. 15, 1960 |
| 2,928,820 | D'Alelio | Mar. 15, 1960 |
| 2,933,485 | D'Alelio | Apr. 19, 1960 |
| 2,953,554 | Miller | Sept. 20, 1960 |
| 2,953,556 | Wolfe | Sept. 20, 1960 |

FOREIGN PATENTS

| | | |
|---|---|---|
| 611,157 | Great Britain | Oct. 26, 1948 |
| 874,215 | Germany | Apr. 20, 1953 |
| 781,837 | Great Britain | Aug. 28, 1957 |

OTHER REFERENCES

Mellor: A Comprehensive Treatise on Inorganic and Theoretical Chemistry, vol. 7, page 76, Longmans, Green & Co., N.Y. (1927).